(12) United States Patent
Daikuhara et al.

(10) Patent No.: US 8,506,176 B2
(45) Date of Patent: Aug. 13, 2013

(54) PHOTOELECTRIC CONVERSION MODULE AND PHOTOELECTRIC CONVERSION DEVICE

(75) Inventors: Osamu Daikuhara, Shinagawa (JP); Kazuhiro Mizukami, Shinagawa (JP); Toshihiro Kusagaya, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 157 days.

(21) Appl. No.: 13/067,317

(22) Filed: May 24, 2011

(65) Prior Publication Data

US 2011/0293225 A1 Dec. 1, 2011

(30) Foreign Application Priority Data

May 28, 2010 (JP) .................................. 2010-123433

(51) Int. Cl.
*G02B 6/36* (2006.01)
(52) U.S. Cl.
USPC .................. 385/89; 385/14; 385/15; 385/88; 385/90; 385/91; 385/92; 385/93; 385/94

(58) Field of Classification Search
USPC ....................................................... 385/15–94
See application file for complete search history.

(56) References Cited

U.S. PATENT DOCUMENTS

2007/0122088 A1* 5/2007 Yoshida et al. ................. 385/89
2009/0310914 A1* 12/2009 Sasaki et al. .................... 385/32

FOREIGN PATENT DOCUMENTS

JP 2008-015264 1/2008

* cited by examiner

*Primary Examiner* — Ryan Lepisto
*Assistant Examiner* — Guy Anderson
(74) *Attorney, Agent, or Firm* — Staas & Halsey LLP

(57) ABSTRACT

A photoelectric conversion module includes: a plurality of optical connectors each connectable to an optical communication path; an electrical connector connectable to an electrical communication path; a circuit board equipped with a light receiving and emitting element, the light receiving and emitting element converting an optical signal received by the optical connector into an electrical signal to be transmitted to the electrical connector and converting an electrical signal received by the electrical connector into an optical signal to be transmitted to the optical connector; and a waveguide optically connecting the optical connector and the electrical connector.

11 Claims, 6 Drawing Sheets

48pin

| G | S | G | S |
|---|---|---|---|
| S | S | S | S |
| S | G | S | G |
| G | S | G | S |
| S | S | S | S |
| S | G | S | G |
| G | S | G | S |
| S | S | S | S |
| S | G | S | G |
| G | S | G | S |
| S | S | S | S |
| S | G | S | G |

60pin

| L | T | P | P |
|---|---|---|---|
| F | G | P | G |
| G | S | G | S |
| S | S | S | S |
| S | G | S | G |
| G | S | G | S |
| S | S | S | S |
| S | G | S | G |
| G | S | G | S |
| S | S | S | S |
| S | G | S | G |
| G | S | G | S |
| S | S | S | S |
| S | G | S | G |
| G | P | G | P |

PHOTOELECTRIC CONVERSION MODULE AND PHOTOELECTRIC CONVERSION DEVICE

CROSS-REFERENCE TO RELATED APPLICATION

This application is based upon and claims the benefit of priority of the prior Japanese Patent Application No. 2010-123433, filed on May 28, 2010, the entire contents of which are incorporated herein by reference.

FIELD

A certain aspect of the embodiments discussed herein is related to a photoelectric conversion module and a photoelectric conversion device allowing two-way communication.

BACKGROUND

With the developments and progresses of the computer technology and the communication system, there is a demand for a simple optical transceiver technology which connects devices arranged at a wide distance from several 10 meters to 300 millimeters beyond the limit in a distance of high-speed transmission using a copper wire. Such an optical transceiver modularized and miniaturized is disclosed in Japanese Patent Application Publication No. 2008-15264.

In Japanese Patent Application Publication No. 2008-15264, an electrical connector, a converting portion, and a waveguide are mounted on a single circuit board, whereby a photoelectric conversion module is miniaturized.

Incidentally, in such a photoelectric conversion device, the transmission of high-capacity data is required in addition to high-speed communication. It is therefore an object of the present invention to provide a photoelectric conversion module and a photoelectric conversion device enabling high-speed and high-capacity communication.

SUMMARY

According to an aspect of the present invention, there is provided a photoelectric conversion module including: a plurality of optical connectors each connectable to an optical communication path; an electrical connector connectable to an electrical communication path; a circuit board equipped with a light receiving and emitting element, the light receiving and emitting element converting an optical signal received by the optical connector into an electrical signal to be transmitted to the electrical connector and converting an electrical signal received by the electrical connector into an optical signal to be transmitted to the optical connector; and a waveguide optically connecting the optical connector and the electrical connector.

The objects and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are explanatory views of pin assignments of an electrical connector;

DESCRIPTION OF EMBODIMENTS

Embodiments according to the present invention will be described in detail with reference to the accompanying drawings.

Figure 1A:
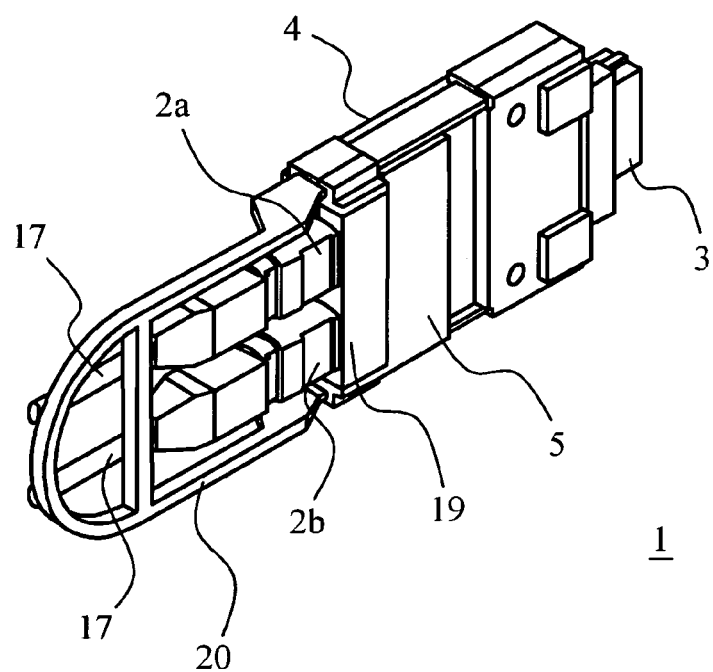
FIGS. 1A and 1B are perspective views of an appearance of a transceiver module.
Figure 1B:
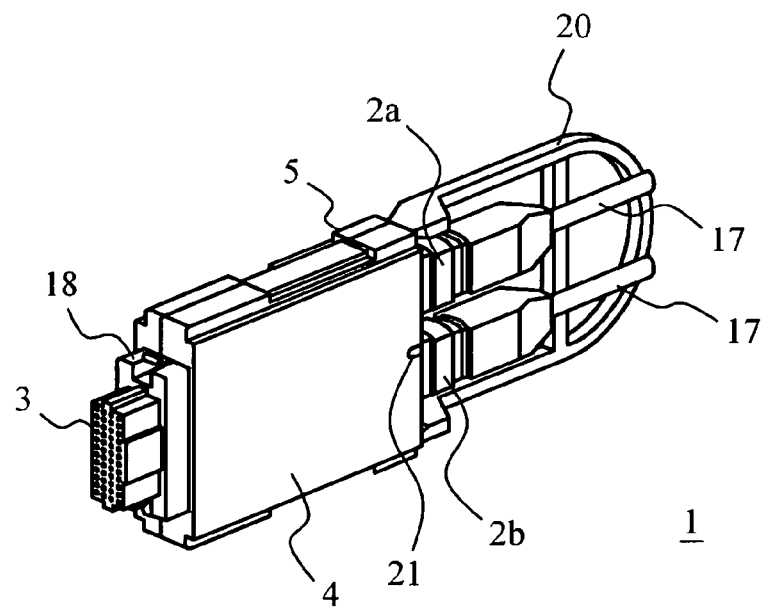
Figure 2:
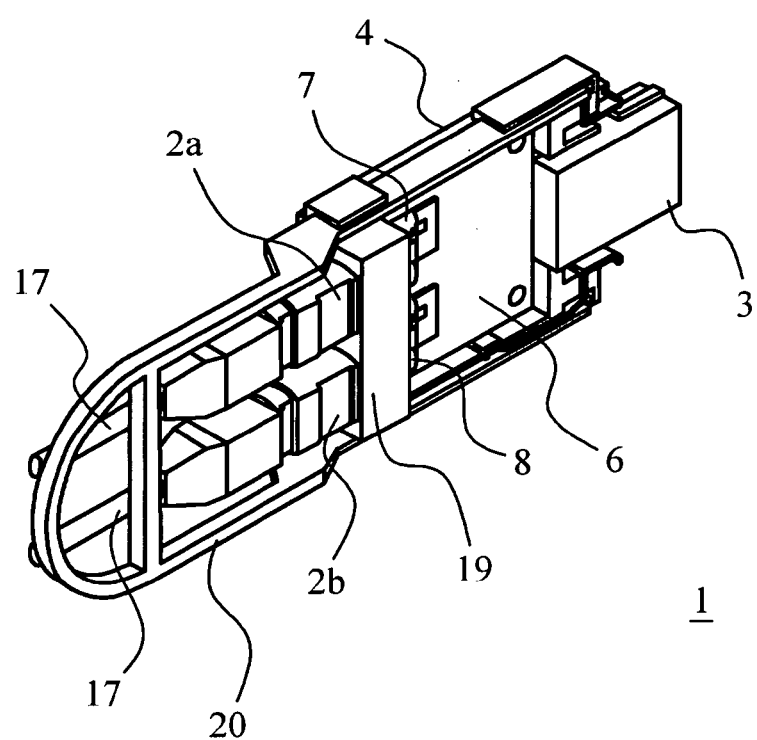
FIG. 2 is a perspective view illustrating an inner structure with a cover removed.
Figure 3A:
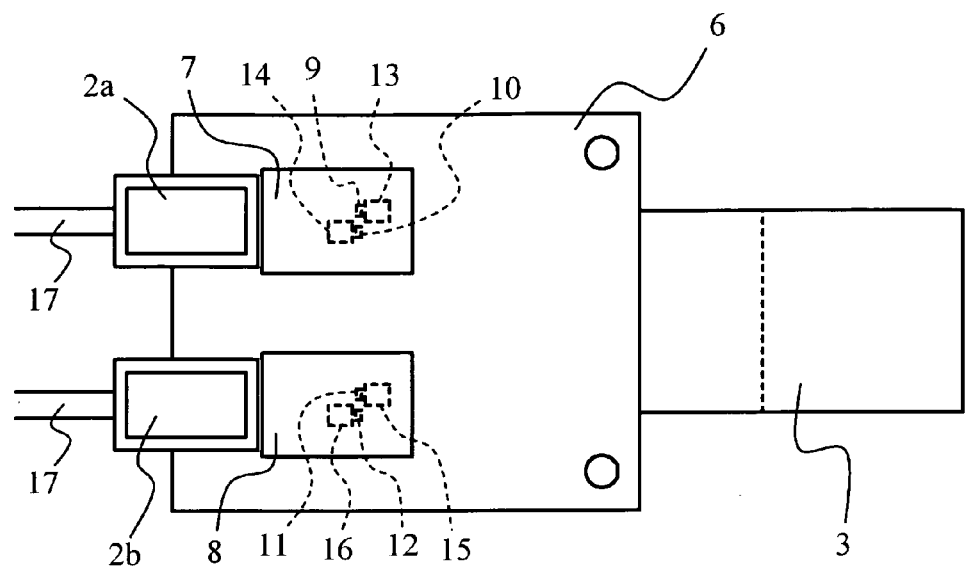
FIGS. 3A and 3B are explanatory views of a basic structure of the transceiver module.
Figure 3B:
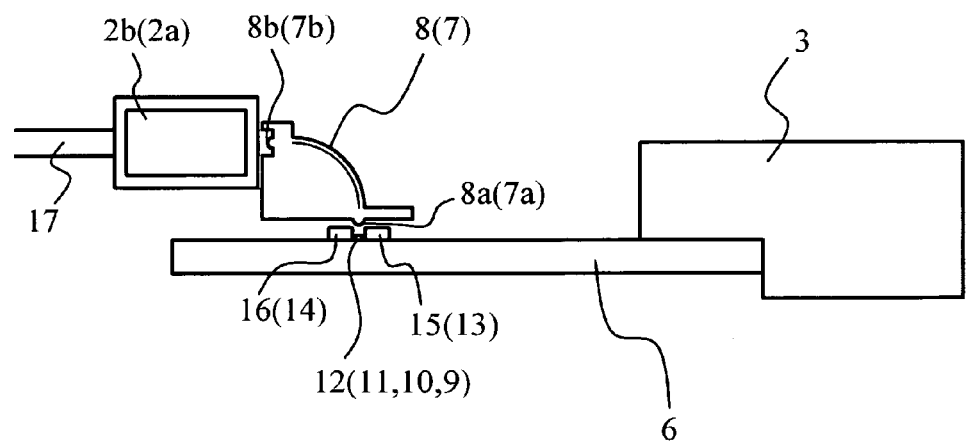

One embodiment according to the present invention will be described with reference to the drawings. FIGS. 1A and 1B are perspective views of an appearance of a transceiver module 1. FIG. 1A is the view when viewed from a front side. FIG. 1B is the view when viewed from a rear side. FIG. 2 is a perspective view illustrating an inner structure with a cover removed. FIGS. 3A and 3B are explanatory views of a basic structure of the transceiver module 1. FIG. 3A is the explanatory view of a circuit board 2 when viewed from a mounting surface side. FIG. 3B is the explanatory view of the circuit board 2 when viewed from a side.

The transceiver module 1 according to the present embodiment is a photoelectric converter which is equipped with two optical connectors 2a and 2b connected to an optical communication path (optical fiber) 17 and a single electrical connector 3. The optical connectors 2a and 2b are 12-core MPO type optical connectors, and each having a transmission speed 6.25 Gbps/lane. The electrical connector 3 is a socket connector for a high-speed balanced transmission. For example, the electrical connector 3 is connected to a connector mounted in a back plane of a computer.

The transceiver module 1 is equipped with a circuit board 6 and waveguide arrays 7 and 8 within a chassis composed of a case 4 and a cover 5. As illustrated in FIG. 3A, on a surface of the circuit board 6 mounted VCSEL (a surface emitting laser) arrays 9 and 10 as light emitting elements and PINPD (photodiode) arrays 11 and 12 as light receiving elements. Further, ICs 13 to 16 are mounted on the same surface of the circuit board 6. On the basis of the electrical signals from the electrical connector 3, the ICs 13 and 14 respectively drive the VCSEL arrays 9 and 10, and the ICs 15 and 16 respectively amplify electrical signals transmitted from the PD arrays 11 and 12 receiving the optical signals, and transmit the electrical signals to the electrical connector 3. On the circuit board 6, the VCSEL arrays 9 and 10 and the ICs 13 and 14 are arranged close to one another, and the PD arrays 11 and 12 and the ICs 15 and 16 are arranged close to one another.

Each of the waveguide arrays 7 and 8 is a three-dimensional polymer waveguide array made of a transparent resin and molded in a curved surface shape. Each of the waveguide arrays 7 and 8 is equipped with a waveguide changing a course of light. One-ends Ends 7a and 8a of the waveguide arrays 7 and 8 are formed at positions to face the circuit board 6. Other ends 7b and 8b of the waveguide arrays 7 and 8 are formed at positions to face a surface perpendicular to the surface of the circuit board 6.

In the transceiver module 1 according to the present embodiment, the waveguide array 7 is located at the upper side of the VCSEL arrays 9 and 10 and the ICs 13 and 14, and functions as a waveguide for transmission. The waveguide array 7 is arranged such that the end 7a of the waveguide faces the VCSEL arrays 9 and 10. Further, the other end 7b of the waveguide is arranged to face the optical connector 2a.

The other waveguide array 8 is located at the upper side of the PD arrays 11 and 12 and the ICs 15 and 16, and functions as a waveguide for reception. This waveguide array 8 is arranged such that the end 8a of the waveguide faces the PD arrays 11 and 12. Further, the other end 8b of the waveguide is arranged to face the optical connector 2b.

Although each of the waveguide arrays 7 and 8 performs one-way communication in the above description, it can perform two-way communication of the transmission and the reception. The arrangements of the VCSEL array and the PD array on the circuit board 6 may be chosen, except for the above described arrangements. For example, the VCSEL array 10 and the PD array 11 may be exchanged for each other and the IC 14 and the IC 15 may be exchanged for each other, since both transmission and reception are performed by a waveguide of a single waveguide array.

The flow of the signals transmitted by this transceiver module 1 will be described below. When the electrical signals of the transmission data are input into the ICs 13 and 14 from the electrical connector 3, the ICs 13 and 14 respectively drive the VCSEL arrays 9 and 10. The VCSEL arrays 9 and 10 convert the electrical signals into optical signals and emit light toward the end 7a of the waveguide. The course of the optical signals is changed by the waveguide, and the optical signals are transmitted from the end 7b through the optical connector 2a to an optical communication path 17. On the other hand, the flow of the signals received by the transceiver module 1 will be described below. When the optical signals transmitted through the optical communication path 17 arrive at the optical connector 2b, the optical signals enter the end 8b of the waveguide. The course of the optical signals is changed by the waveguide to be emitted from the end 8a toward the PD arrays 11 and 12. When the PD arrays 11 and 12 receive the optical signals, the PD arrays 11 and 12 convert the received optical signals into electrical signals to transmit the electrical signals to the ICs 15 and 16. The ICs 15 and 16 amplify the electrical signals and transmit the electrical signals to the electrical connector 3.

In such a transceiver module, a method for making a communication path large or increasing the number of the communication paths can be employed in order to increase the amount of communication per unit time. Even if any one of these methods is employed, the transceiver module communicates the optical signals by the use of a single waveguide. When the optical signals are introduced by the single waveguide, the number of passing signals is increased. It is thus necessary to make the waveguide large. However, the waveguide is misaligned more by its expansion and contraction as the waveguide is made larger. This may degrade the transmission accuracy of signals. For this reason, the distribution of optical signals and the use of a small waveguide are effective. Also, in cases where communication data transmitted from a single communication path are divided into plural signals to be transmitted to plural waveguides, a spectroscope is needed, making the configuration complicated. Thus, the increase in the size of the communicative path is inadvisable. In contrast, in the transceiver module 1 according to the present embodiment, the optical connector 2a and the VCSEL arrays 9 and 10 are optically connected to each other through the waveguide array 7 having the waveguide, and the optical connector 2b and the PINPD arrays 11 and 12 are optically connected to each other through the waveguide array 8 having the waveguide. That is, in the transceiver module 1 according to the present embodiment, the degradation in the transmission accuracy of signals is suppressed by providing the plural waveguides. Moreover, the plural optical connectors 2a and 2b receive optical signals. Thus, the complicated configuration such as spectroscopes is not needed. In particular, conventional optical connectors can be used as the optical connectors 2a and 2b, and conventional optical communication paths connecting thereto can be employed as optical communication paths 17. It is therefore possible to suppress the production cost. With the above configuration, the transceiver module 1 enables high-capacity data communication.

Also, a latch 18 is provided at the electrical connector 3 side of the transceiver module 1, as illustrated in FIG. 1. The transceiver module 1 is connected to a back plane to be locked by the latch 18. This prevents the sudden detachment of the main body of the transceiver module 1 from the back plane. On the other hand, a pull-tab 20 is provided in the transceiver module 1. This facilitates the detachment of the transceiver module 1 from the back plane.

Also, an MPO latch 19 is provided in the optical connector 2a of the transceiver module 1. The optical communication paths 17 are connected to the optical connectors 2a and 2b, so that they are locked by the MPO latch 19. This prevents the detachment of the optical communication paths 17 from the optical connectors 2a and 2b.

Also, a light emitting diode (LED) light 21 is provided in the optical connectors 2a and 2b side of the case 4. This LED light 21 is located at the position visible from the rear side of the transceiver module 1 and in the direction where the optical communication paths 17 are connected thereto. For this reason, the LED light 21 is visible, even if the plural transceiver modules 1 are adjacent to each other to be attached to the back plane. The LED light 21 can change in light pattern or in light color in order to visibly identify a state where the transceiver module 1 is attached to the back plane to establish the link, a state where power is supplied, a state where the optical communication path 17 is connected to establish the link, and a communication state. That is, the LED light 21 is checked, thereby grasping a state of the transceiver module 1 with ease.

Next, pin assignments of the electrical connector 3 will be described. FIGS. 4A and 4B are explanatory views of the pin assignments of the electrical connector 3. FIG. 4A illustrates pin assignments for comparison, and FIG. 4B illustrates pin assignments in cases where the number of pins is increased in the present embodiment. In FIGS. 4A and 4B, a signal pin is represented by S, a ground pin is represented by G, a control signal pin is represented by T (Type-sence), F (Fault), or L (laser-disable), and a power supply pin is represented by P.

In the transmission and reception of signals, adjacent two signal pins play a role of the transmission and reception of a signal. The adjacent two signal pins are sandwiched by the ground pins, thereby increasing the stability of signals. In the present embodiment, the number of pins is increased, the signal pins are arranged at positions other than both edges of the whole arrangement (the upper edge and the lower edge illustrated in FIG. 4B), and any signal pins are sandwiched by the ground pins. This stabilizes the transmission and reception of signals and improves the transmission property. Further, the signal pin is not adjacent to the control pin and the power supply pin, whereby suppressing noise and improving the transmission property. Furthermore, five power supply pins are provided so as to distribute required electric current in the present embodiment. It is therefore possible to reduce an increase in the temperature of each pin. Moreover, in the pin assignments, the ground pin can substitute for the power supply pin or the control pin, and a control signal can be transmitted through a wiring connecting to the ground pin. This also can reduce the number of pins.

Figure 5:
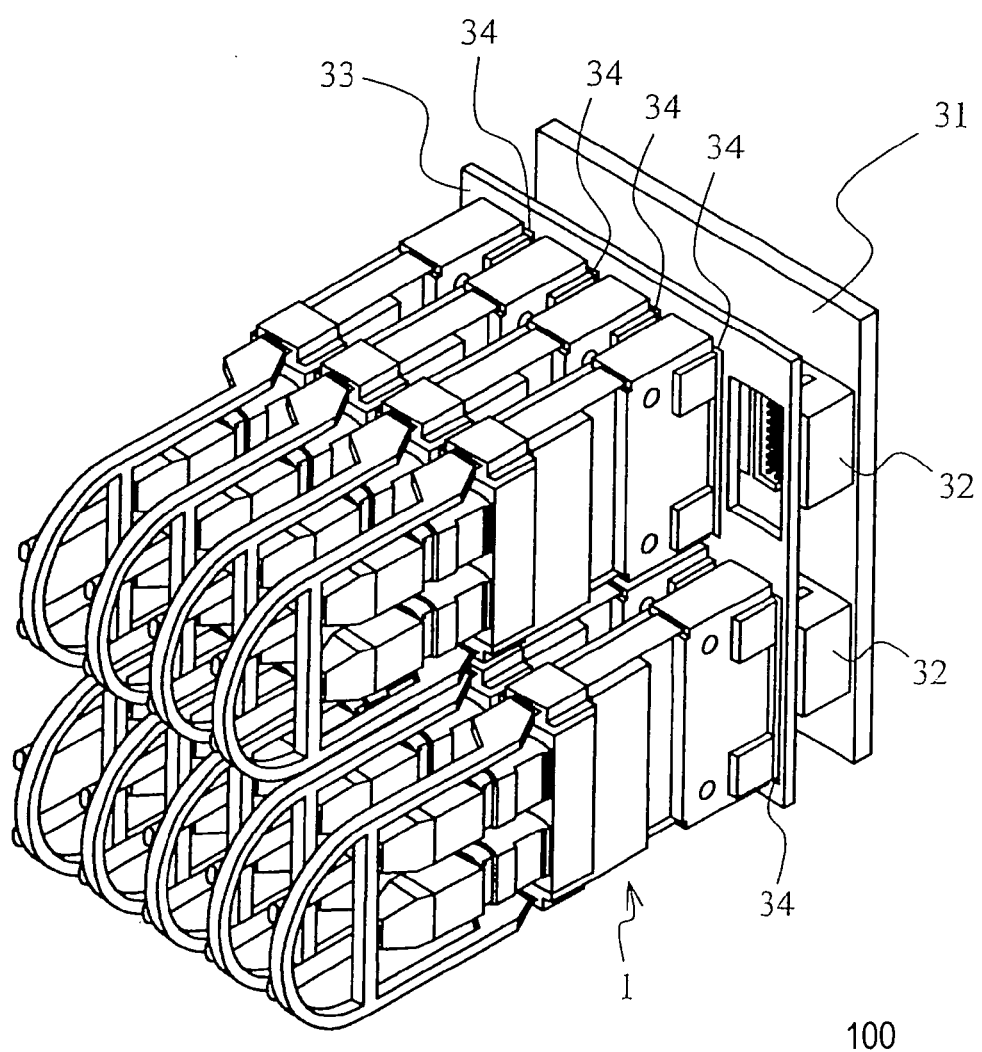
FIG. 5 is a perspective view of an appearance of a transceiver device.

Next, another embodiment according to the present invention will be described. A transceiver device 100 according to the present invention will be described in the present embodiment. FIG. 5 is a perspective view of an appearance of the transceiver device 100 according to the present invention. In the transceiver device 100, plural transceiver modules 1 are attached to a back plane 31. The back plane 31 is equipped with plural BP connectors 32 connectable to the electrical connectors 3 of the transceiver modules 1.

In this way, plural transceiver modules 1 are connected to the transceiver device 100, whereby the transceiver device 100 enables high-capacity data communication. Even if the plural transceiver modules 1 illustrated in FIG. 5 are connected, the LED lights 21 are visible from the optical communication path side. It is thus possible to confirm the connection states of the transceiver modules 1.

Also, in the transceiver device 100, the transceiver modules 1 are connected to the back plane 31 through a panel 33. This panel 33 defines a wall surface of the computer equipped with the back plane 31. When the transceiver module 1 is connected to the back plane 31, the latch 18 is latched with the panel 33. Further, an Electro Magnetic Interference (EMI) gasket 34 is provided between the panel 33 and the transceiver module 1. The EMI gasket 34 prevents the unnecessary emission of the electric wave from the transceiver module 1 to the back plane 31.

Figure 6:
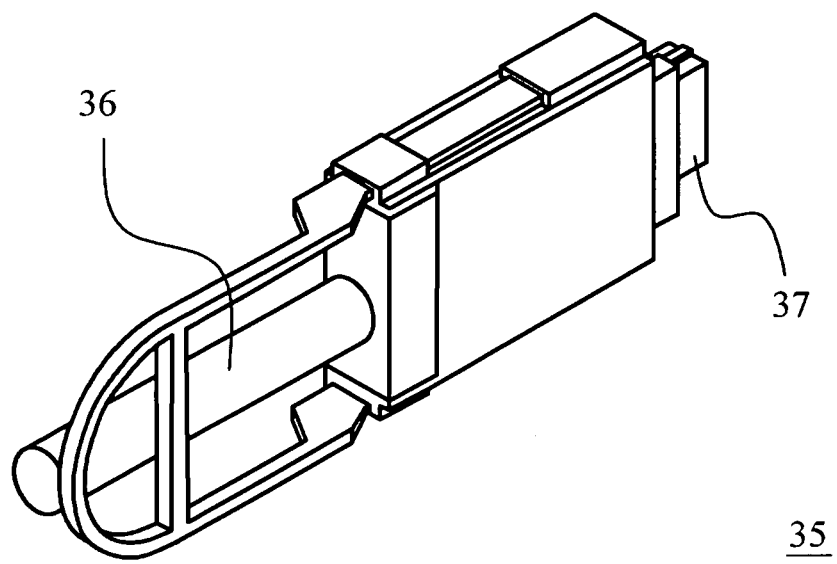
FIG. 6 is a perspective view of an appearance of an electrical cable module.

Also, an electrical cable module 35 can be connected to the BP connector 32 of this back plane 31. FIG. 6 is a perspective view of an appearance of the electrical cable module 35. The electrical cable module 35 is connected with an electrical cable 36 supplying power to a computer equipped with the back plane 31. A shape of an interface connector 37 of the electrical cable module 35 is common to a shape of the electrical connector 3 of the transceiver module 1. It is therefore possible to connect the electrical cable module 35 to the back plane 31. The interface connector 37 of the electrical cable module 35 is connected to the electrical cable 36 via a paddle card which is an relay wiring board. Also, the interface connectors 37 are mounted on both surfaces of the paddle card.

In this way, the interface of the electrical cable module 35 is common to the interface of the transceiver module 1, whereby a single interface connector can be used for communication and for power supply. This also eliminates the need of the separate provision of another connection terminal for the electrical cable. It is therefore possible to reduce the production cost of the transceiver device 100. Like the transceiver module 1, the electrical cable module 35 also may be equipped with a latch, a pull-tab, and an LED light.

In the present embodiment, the transceiver module 1 is equipped with two optical connectors 2a and 2b. However, the transceiver module 1 may be equipped with at least three optical connectors. This case enables more higher-capacity data communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A photoelectric conversion module comprising:
a plurality of optical connectors each connectable to an optical communication path;
an electrical connector connectable to an electrical communication path;
a circuit board with a plurality of light receiving and emitting elements, the light receiving and emitting elements converting an optical signal received by the optical connectors into an electrical signal to be transmitted to the electrical connector and converting an electrical signal received by the electrical connector into an optical signal to be transmitted to the optical connectors; and
a plurality of waveguide arrays optically connecting the optical connectors and the light receiving and emitting elements,
wherein the plurality of the light receiving and emitting elements respectively correspond to the plurality of the optical connectors, and corresponding light receiving and emitting elements and optical connectors are connected to each other via one of the waveguide arrays,
wherein each of the waveguide arrays is a three-dimensional polymer waveguide array made of a resin, has a curved surface shape, and a waveguide is formed at the curved surface,
wherein one ends of the waveguide arrays face a surface of the circuit board, and other ends of the waveguide arrays face a surface substantially perpendicular to the surface of the circuit board, and
wherein the waveguide arrays are arranged such that the one ends face the light receiving and emitting elements and the other ends face the optical connectors.

2. The photoelectric conversion module of claim 1, wherein the waveguide is used for one or two way communication.

3. The photoelectric conversion module of claim 1, wherein the electrical connector is a single electrical connector.

4. The photoelectric conversion module of claim 1, further comprising a detachment prevention portion preventing a module main body from being detached from the electrical connector when the electrical connector is connected to the module main body.

5. The photoelectric conversion module of claim 1, further comprising a display portion displaying at least one of a state where a link of the electrical connector is established, a state where a link of the optical connector is established, and a state where power is supplied.

6. The photoelectric conversion module of claim 5, wherein the display portion is arranged at a side of each of the plurality of optical connectors sideof the module.

7. The photoelectric conversion module of claim 1, further comprising an electric wave shielding member provided at the electrical connector side.

8. The photoelectric conversion module of claim 1, wherein terminals of the electrical connector include a signal pin, a control pin, and a power supply pin.

9. The photoelectric conversion module of claim 1, wherein terminals of the electrical connector include a ground pin.

10. A photoelectric conversion device comprising: a photoelectric conversion module comprising: a plurality of optical connectors each connectable to an optical communication path; an electrical connector connectable to an electrical communication path; a circuit board with a plurality of light receiving and emitting elements, the light receiving and emitting elements converting an optical signal received by the optical connectors into an electrical signal to be transmitted to the electrical connector and converting an electrical signal received by the electrical connector into an optical signal to be transmitted to the optical connectors; a plurality of waveguide arrays optically connecting the optical connectors and the light receiving and emitting elements; wherein the plurality of the light receiving and emitting elements respectively correspond to the plurality of the optical connectors, and corresponding light receiving and emitting elements and optical connectors are connected to each other via one of the waveguide arrays, wherein each of the waveguide arrays is a three-dimensional polymer waveguide array made of a resin, has a curved surface shape, and a waveguide is formed at the curved surface, wherein one ends of the waveguide arrays face a surface of the circuit board, and other ends of the waveguide arrays face a surface substantially perpendicular to the surface of the circuit board, and wherein the waveguide arrays are arranged such that the one ends face the light receiving and emitting elements and the other ends face the optical connectors; and a back plane provided with a plurality of connectors each connectable to the electrical connector of the photoelectric conversion module, wherein the photoelectric conversion module is connected to the back plane.

11. The photoelectric conversion device of claim 10, further comprising an electrical cable module including a connector common to the electrical connector, supplying power, and connected to one of the plurality of connectors of the back plane.

* * * * *

UNITED STATES PATENT AND TRADEMARK OFFICE
CERTIFICATE OF CORRECTION

PATENT NO. : 8,506,176 B2
APPLICATION NO. : 13/067317
DATED : August 13, 2013
INVENTOR(S) : Osamu Daikuhara et al.

It is certified that error appears in the above-identified patent and that said Letters Patent is hereby corrected as shown below:

In the Claims

In Col. 6, Line 51, In Claim 6, delete "connectors sideof" and insert -- connectors of --, therefor.

Signed and Sealed this
Third Day of December, 2013

Margaret A. Focarino
*Commissioner for Patents of the United States Patent and Trademark Office*